(12) United States Patent  
Glidden et al.

(10) Patent No.: US 6,493,204 B1  
(45) Date of Patent: Dec. 10, 2002

(54) MODULATED VOLTAGE FOR A SOLENOID VALVE

(75) Inventors: David J. Glidden, Canton, MI (US); Daniel D. Moore, Canton, MI (US); Gary P. Whelan, South Lyon, MI (US)

(73) Assignee: Kelsey-Hayes Company, Livonia, MI (US)

( * ) Notice: Subject to any disclaimer, the term of this patent is extended or adjusted under 35 U.S.C. 154(b) by 0 days.

(21) Appl. No.: 09/385,997

(22) Filed: Aug. 30, 1999

Related U.S. Application Data

(63) Continuation-in-part of application No. 09/350,574, filed on Jul. 9, 1999, now abandoned.

(51) Int. Cl.$^7$ ................................................ H01H 47/32
(52) U.S. Cl. ....................................... 361/187; 361/154
(58) Field of Search ............................. 361/152–156, 361/160, 187; 340/644; 324/415, 418

(56) References Cited

U.S. PATENT DOCUMENTS

| | | | |
|---|---|---|---|
| 3,832,010 A | 8/1974 | Grosseau | |
| 3,864,608 A * | 2/1975 | Normile et al. | 317/154 |
| 4,123,116 A * | 10/1978 | Carp et al. | 303/103 |
| 4,169,401 A * | 10/1979 | Walker | 361/154 |
| 4,266,261 A | 5/1981 | Streit et al. | |
| 4,452,210 A * | 6/1984 | Sasayama et al. | 361/154 |
| 4,516,185 A | 5/1985 | Culligan et al. | |
| 4,630,165 A | 12/1986 | D'Onofrio | |
| 4,661,766 A | 4/1987 | Hoffman et al. | |
| 4,737,882 A | 4/1988 | D'Onofrio | |
| 4,764,840 A | 8/1988 | Petrie | |
| 4,812,945 A | 3/1989 | D'Onofrio | |
| 4,878,147 A | 10/1989 | Oyama et al. | |
| 4,905,120 A * | 2/1990 | Grembowicz et al. | 361/154 |
| 4,949,215 A | 8/1990 | Studtmann et al. | |
| 4,978,865 A | 12/1990 | Hartmann et al. | |
| 5,053,911 A | 10/1991 | Kopec et al. | |
| 5,115,395 A * | 5/1992 | Petzold | 364/424.1 |
| 5,159,522 A * | 10/1992 | Gray | 361/154 |
| 5,202,813 A * | 4/1993 | Uota et al. | 361/154 |
| 5,304,935 A | 4/1994 | Rathke et al. | |
| 5,347,419 A | 9/1994 | Caron et al. | |
| 5,404,303 A | 4/1995 | Pattantyus et al. | |
| 5,422,780 A | 6/1995 | Lignar | |
| 5,430,601 A | 7/1995 | Burcham | |
| 5,442,515 A | 8/1995 | Wallaert | |
| 5,559,438 A | 9/1996 | Bedouet et al. | |
| 5,645,097 A | 7/1997 | Zechmann et al. | |
| 5,647,387 A * | 7/1997 | Tsutsui | 361/154 |
| 5,650,909 A * | 7/1997 | Remele et al. | 361/154 |
| 5,701,870 A * | 12/1997 | Gottshall et al. | 361/154 |
| 5,703,748 A | 12/1997 | Fulks et al. | |
| 5,818,678 A * | 10/1998 | Berg et al. | 361/152 |
| 5,818,679 A | 10/1998 | Schustek et al. | |
| 5,910,890 A | 6/1999 | Hansen et al. | |
| 5,915,799 A | 6/1999 | Bourlon et al. | |
| 6,019,441 A * | 2/2000 | Lloyd et al. | 303/156 |
| 6,056,000 A * | 5/2000 | Santacatterina et al. | 137/1 |
| 6,061,224 A | 5/2000 | Allen | |
| 6,157,095 A * | 12/2000 | Namuduri | 361/154 |
| 6,208,498 B1 * | 3/2001 | Ueda | 361/160 |

FOREIGN PATENT DOCUMENTS

| | | |
|---|---|---|
| DE | 40 13 393 A1 | 10/1991 |
| EP | 0 452 562 A1 | 10/1991 |
| EP | 0 779 631 A2 | 6/1997 |
| EP | 0 908 364 A2 | 9/1998 |
| WO | WO 95/03963 | 2/1995 |
| WO | WO 97/44225 | 11/1997 |

* cited by examiner

*Primary Examiner*—Fritz Fleming  
(74) *Attorney, Agent, or Firm*—MacMillan, Sobanski & Todd, LLC

(57) ABSTRACT

A circuit for actuating an ABS solenoid valve coil with a pulse width modulated voltage having a constant frequency and variable duty cycle. The coil current is a function of the duty cycle of the pulse width modulated voltage. By controlling the duty cycle, current saturation of the coil can be avoided to provide for a faster response upon deactuation of the coil. Feedback is included in the circuit to verify correct functioning of electrical components.

17 Claims, 7 Drawing Sheets

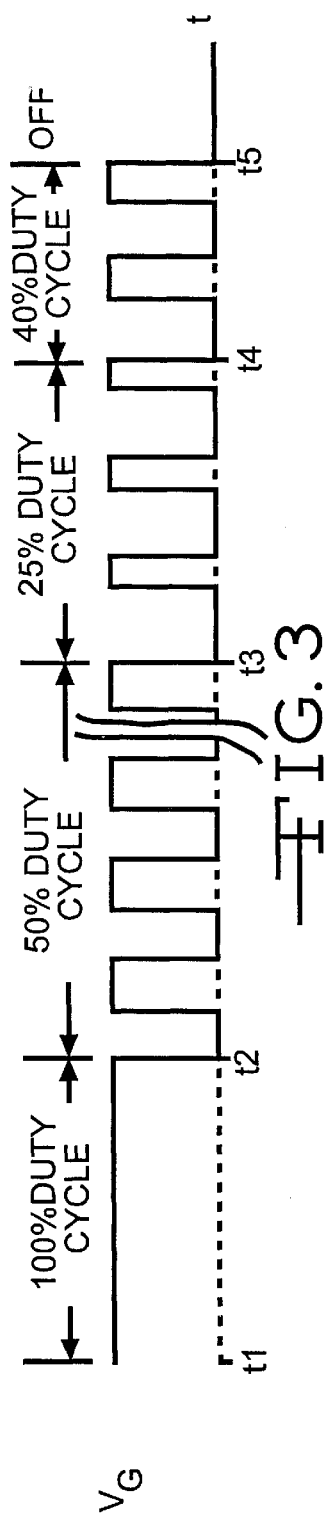
FIG. 3
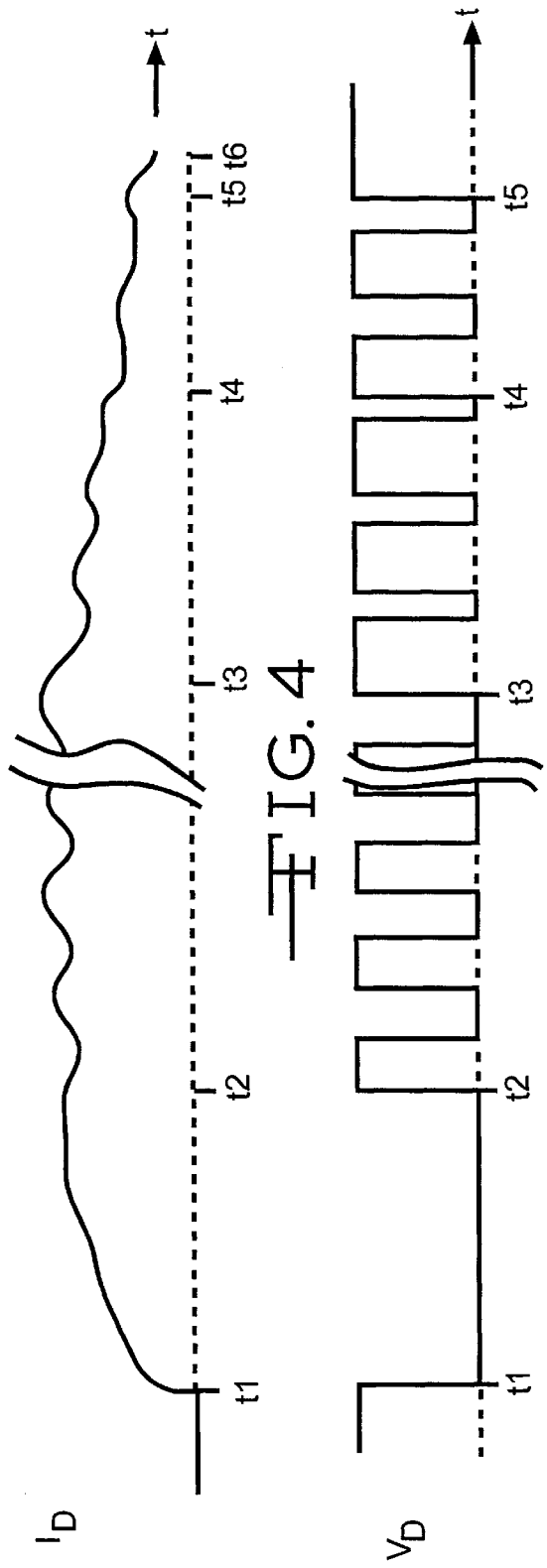
FIG. 4
FIG. 5

MODULATED VOLTAGE FOR A SOLENOID VALVE

CROSS REFERENCE TO RELATED APPLICATIONS

This application is a continuation-in-part of U.S. patent application Ser. No. 09/350,574, filed Jul. 9, 1999, now abandoned.

BACKGROUND OF THE INVENTION

This invention relates in general to anti-lock brake systems and in particular to a circuit and method for modulation of the voltage utilized to actuate solenoid valves in an anti-lock brake system and for verification of correct functioning of electrical components in the anti-lock brake system.

An Anti-lock Brake System (ABS) is often included as standard equipment on new vehicles. When actuated, the ABS is operative to modulate the pressure applied to some or all of the vehicle wheel brakes. A typical ABS includes a hydraulic control valve which has plurality of solenoid valves mounted within a control valve body. The control valve body is connected to the vehicle hydraulic brake system. The valve body also includes an accumulator for the temporary storage of brake fluid during an anti-lock braking cycle.

A separate hydraulic source, such as a motor driven pump, is usually included in the ABS for reapplying hydraulic pressure to the controlled wheels during an ABS braking cycle. Alternately, the pump can return brake fluid from the accumulator to the vehicle master brake cylinder during an ABS braking cycle. The pump is typically included within the control valve body while the pump motor is mounted upon the exterior of the control valve body. The pump motor is usually a direct current motor which operates from the vehicle power supply.

An ABS further includes an electronic control unit which has a microprocessor. The electronic control unit is usually attached to the hydraulic control valve. The microprocessor is electrically coupled to the pump motor, a plurality of solenoid coils associated with the solenoid valves, and wheel speed sensors for monitoring the speed and deceleration of the controlled wheels. The microprocessor includes a memory portion which stores an ABS control algorithm. The ABS control algorithm comprises a set of instructions for the microprocessor which control the operation of the ABS. The instructions typically include a set of operational checks which are run during vehicle start up to assure that the ABS is functional. The control program also includes subroutines for monitoring the vehicle operation to detect a potential lock-up of the controlled wheel brakes and for the actual operation of the ABS during an anti-lock braking cycle.

During vehicle operation, the microprocessor in the ABS control unit continuously receives speed signals from the wheel speed sensors. The microprocessor monitors the speed signals for potential wheel lock-up conditions. When the vehicle brakes are applied and the microprocessor senses an impending wheel lock-up condition, the microprocessor is operative to initiate an ABS braking cycle. During the ABS braking cycle, the microprocessor actuates the pump motor and selectively operates the solenoid valves in the control valve to cyclically relieve and reapply hydraulic pressure to the controlled wheel brakes. The hydraulic pressure applied to the controlled brakes is adjusted by the operation of the solenoid valves to limit wheel slippage to a safe level while continuing to produce adequate brake torque to decelerate the vehicle as desired by the vehicle operator.

SUMMARY OF THE INVENTION

This invention relates to a circuit and method for modulation of the voltage utilized to actuate solenoid valves in an anti-lock brake system and for verification of correct functioning of electrical components in the anti-lock brake system.

As described above, a typical ABS modulates the pressure applied to the controlled wheel brakes by cyclically opening and closing solenoid valves. In prior art systems, such valves have been digital, having two operating positions, open or closed. The valve is quickly switched between the two positions. Such switching can cause undesirable acoustic noise, particularly at low vehicle speeds where the noise is more noticeable. Additionally, the solenoid coil may be driven into saturation, causing a delay in valve transition when the solenoid current is interrupted. Accordingly, it would be desirable to provide a better control of the solenoid valves while also reducing the hydraulic system noise caused by operation of the valves.

The present invention contemplates a control unit for a solenoid valve comprising an electronic switch adapted to be connected to a solenoid valve coil for controlling the flow of an electric current therethrough. The switch includes a control port and is responsive to a control signal applied to the control port to transition between conducting and non-conducting stages. The control unit also includes a signal generator connected to the control port of said electronic switch. The signal generator is operative to generate a control signal which can be a pulse train signal having either a variable duty cycle and a constant frequency or a variable frequency and a constant duty cycle.

In the preferred embodiment, the control signal has a variable duty cycle. Also, the solenoid valve coil is connected between a first terminal of the switch and a power supply while a second terminal of the switch is connected to ground. The current flowing through the coil is a function of the control signal duty cycle. It is further contemplated that the control signal generator is included within a microprocessor.

The control unit also includes a voltage divider connected across the electronic switch. The voltage divider includes a center tap connected to a feedback port of the microprocessor with the microprocessor being responsive to a voltage appearing at the center tap to confirm the operation of the electronic switch.

It is further contemplated that the control unit includes a diode having a cathode connected to the end of the solenoid coil connected to the power supply and a Zener diode having an anode connected to an anode of the diode. The Zener diode also has a cathode connected to the junction of the coil and the electronic switch. The diode and Zener diode are operative to provide a discharge path for the coil current when the switch changes from a conducting to a non-conducting state.

The control unit also includes a feedback resistor connected between the junction of the diode and the Zener diode and the center tap of the voltage divider.

The voltage appearing at the center tap of the voltage divider is a function of the voltage appearing across the solenoid coil and the microprocessor is responsive thereto to confirm the operation of the solenoid coil. The control unit is included in an antilock brake system or a traction control system.

The invention also contemplates a method for controlling the current flowing through a solenoid valve coil which includes providing an electronic switch connected to the valve coil, the switch having a control port and being responsive to a control voltage applied to the control port to change between conducting and non-conducting states. A pulse width modulated control voltage having a constant frequency and variable duty cycle is applied to the control port of the switch. The control voltage has an initial duty cycle having a first predetermined value, the initial duty cycle being sufficient to cause the valve armature to begin to move within the valve from a deactuated position to an actuated position. The duty cycle is reduced to a duty cycle having a second predetermined value upon the valve armature reaching a desired position within the solenoid valve, the second predetermined value being less than the first predetermined value. The second predetermined value is sufficient to provide a coil current which will hold the valve armature in the desired position.

The method further includes decreasing the duty cycle to third predetermined value which is less than the second predetermined value to cause the valve armature to begin to move back toward the deactuated position. The method also can include increasing the duty cycle to a fourth predetermined value as the valve armature approaches the deactuated position to slow the return of the armature to the deactuated position. The fourth predetermined value for the duty cycle is between the second and third predetermined values.

The invention further contemplates a method for monitoring the operation of an electronic switch connected between a solenoid valve coil and ground which includes providing a device for monitoring the voltage across the electronic switch. When the electronic switch is closed, the voltage across the electronic switch is sampled and compared to a first threshold voltage. If the sampled voltage is greater than the first threshold voltage, a warning device is actuated.

When the electronic switch is open, the voltage across the electronic switch is sampled and compared to a second threshold voltage. If the sampled voltage is less than the second threshold voltage, the warning device is actuated. Additionally, the sampled voltage can be compared to a third threshold voltage, which is greater than the second threshold voltage, and the warning device actuated if the sampled coil voltage is greater than the third threshold voltage.

Various objects and advantages of this invention will become apparent to those skilled in the art from the following detailed description of the preferred embodiment, when read in light of the accompanying drawings.

BRIEF DESCRIPTION OF THE DRAWINGS

FIG. 3 illustrates the voltage at an output port of a microprocessor included in the circuit shown in FIG. 2.

FIG. 4 illustrates current flowing through a solenoid coil included in the circuit shown in FIG. 2.

FIG. 5 illustrates the voltage at the drain of a field effect transistor included in the circuit shown in FIG. 2.

DETAILED DESCRIPTION OF THE PREFERRED EMBODIMENT

Figure 1:
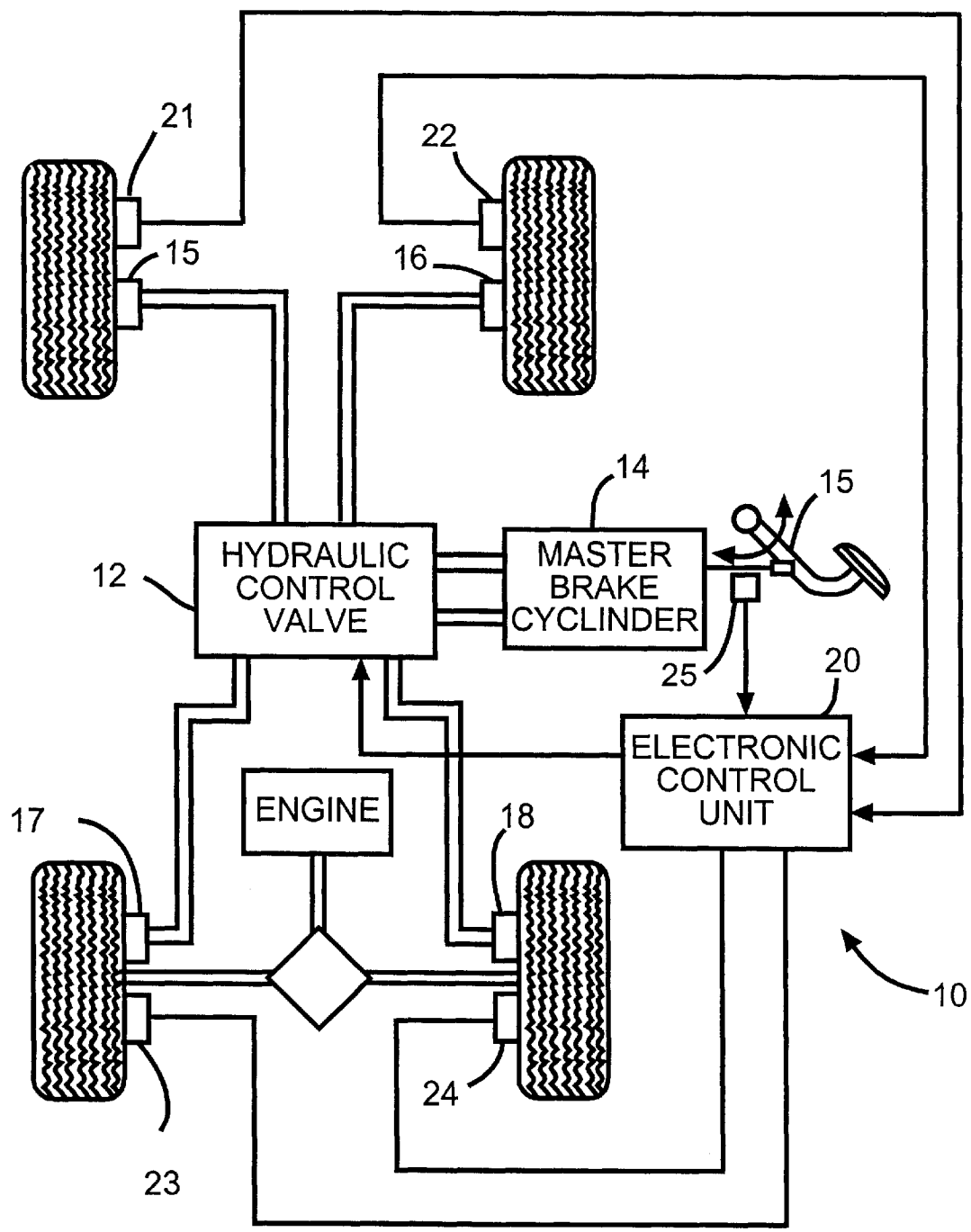
FIG. 1 is a schematic diagram of a typical anti-lock brake system.

Referring now to the drawings, there is illustrated in FIG. 1 a typical Anti-lock Brake System (ABS) 10 which is included in a vehicle hydraulic brake system. The ABS 10 includes a hydraulic control valve 12 which is connected by a pair of hydraulic lines to a conventional master brake cylinder 14. The master brake cylinder 14 is mechanically linked to a vehicle brake pedal 15. The hydraulic control valve 12 also is connected by a first pair of hydraulic lines to left and right front wheel brakes, labeled 15 and 16, respectfully; and by a second pair of hydraulic lines to left and right rear wheel brakes, labeled 17 and 18, respectively. As described above, the hydraulic control valve 12 includes a plurality of solenoid valves (not shown) which are connected between the master brake cylinder 14 and the wheel brakes 15, 16, 17 and 18. The solenoid valves are selectively operated during an anti-lock brake cycle to control the hydraulic pressure applied to the wheel brakes 15, 16, 17 and 18.

The ABS 10 further includes an electronic control unit 20 which includes a microprocessor (not shown). The electronic control unit 20 is electrically coupled to coils which correspond to solenoid valves included in the hydraulic control valve 12. While a single line is shown in FIG. 1 connecting the electronic control unit 20 to the hydraulic control valve 12, it will be appreciated that the single line can represent a plurality of electrical connections. The control unit 20 is operative to actuate the solenoid valves contained in the control valve 12 in accordance with a stored ABS control algorithm. The electronic control unit 20 also is electrically connected to a pair of wheel speed sensors, 21 and 22, which are mounted adjacent to the left and right front wheels, respectively, and a pair of rear wheel sensors, 23 and 24, which are mounted adjacent to the left and right rear wheels, respectively. In place of a pair of rear wheel speed sensors 23 and 24, it also is possible to mount a single speed sensor (not shown) upon the vehicle differential to measure an average rear wheel speed. The electronic control unit 20 is further electrically connected to a vehicle stop light switch 25.

During operation of the vehicle, the microprocessor continuously monitors wheel speed signals generated by the wheel speed sensors for a potential wheel lock-up condition. The microprocessor is responsive to detection of a potential wheel lock-up condition to cyclically apply and relieve the solenoid valves associated with the wheel to prevent the wheel from locking up. The microprocessor will adjust the hydraulic pressure applied to the wheel brake associated with the wheel to provide optimum braking effort.

Figure 2:
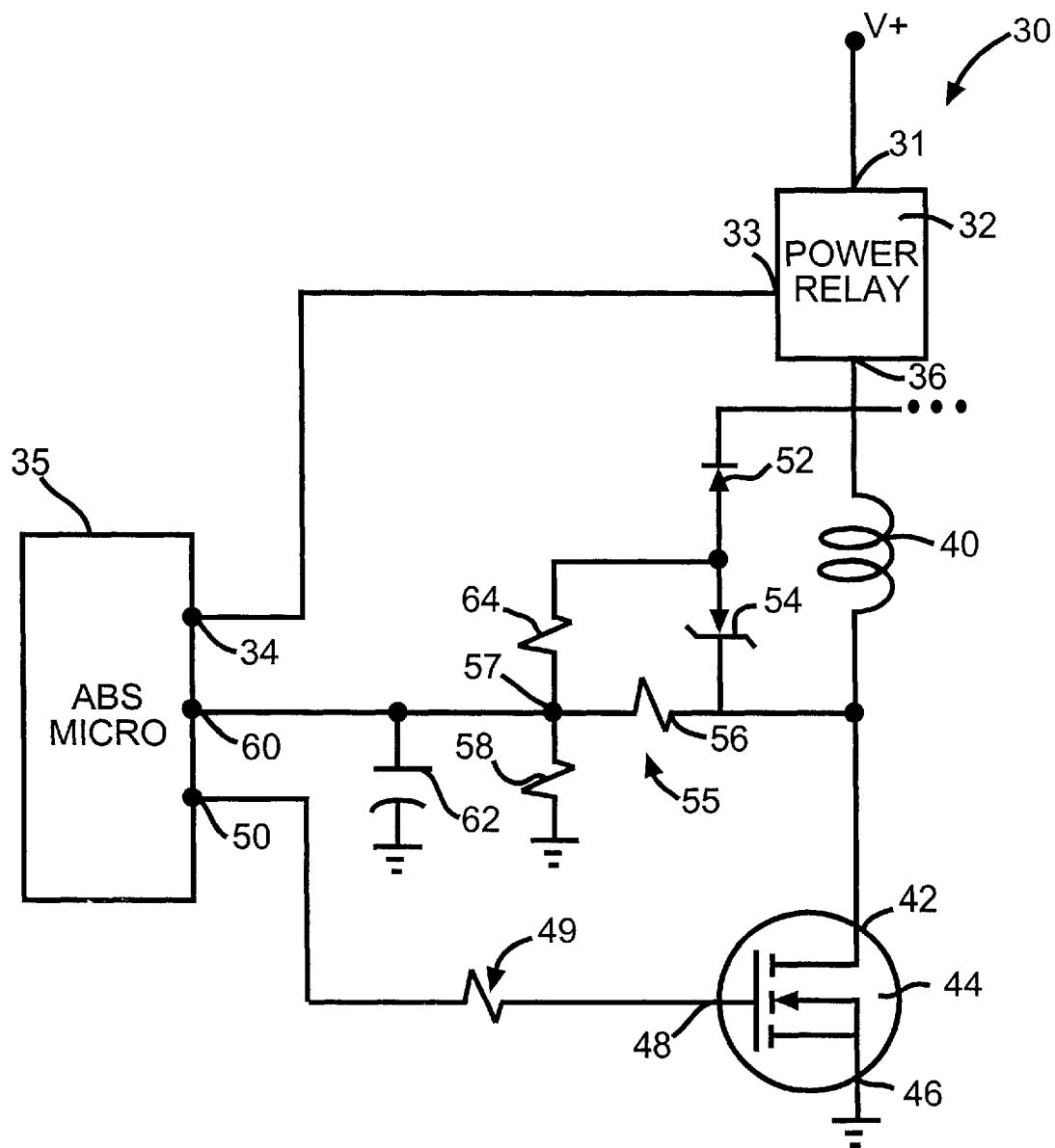
FIG. 2 is a schematic diagram for a voltage modulation circuit in accordance with the invention for a solenoid valve included in the system shown in FIG. 1.

The present invention contemplates an improved method and circuit for actuating the solenoid valves in an ABS hydraulic control valve valves and for verifying correct functioning of electrical components. The improved circuit is illustrated generally at 30 in FIG. 2. A vehicle power supply is connected to an input port 31 of a conventional power relay 32. The power relay 32 can be either a mechanical device or a solid state switch and typically includes a conventional driver. The relay 32 has a control port 33 connected to a relay output port 34 of an ABS microprocessor 35. The relay 32 also has an output port 36 connected to a "high" end of a solenoid coil 40. While only one solenoid coil 40 is shown in FIG. 2, it will be appreciated that the power relay output port 36 would be similarly connected to a high end of all of the solenoid coils in the ABS hydraulic control valve. Additionally, the power relay output port 36 may be electrically connected to the ABS pump motor (not shown).

A "low" end of the solenoid coil 40 is connected to the drain 42 of a power Field effect Transistor (FET) 44. The FET 44 has a source 46 connected to ground.

The FET 44 also has a gate 48 which is connected through a current limiting resistor 49 to a control signal port 50 on the microprocessor 35. In the preferred embodiment, the current limiting resistor 49 is a 1K resistor. During operation of the ABS, the FET 44 is in either a conducting state of a non-conducting state between the drain 42 and source 46. The state of the FET 44 is determined by the voltage applied to the FET gate 48. As will be explained below, the FET 44 functions as an electronic switch to control the flow of current through the solenoid coil 40.

The circuit 30 further includes a diode 52 having a cathode connected to the power relay output port 36 and an anode connected to an anode of a Zener diode 54. The Zener diode 54 has a cathode which is connected to the FET drain 42.

A voltage divider 55 is connected between the FET drain 42 and ground. The voltage divider 55 includes a first resistor 56 connected between the FET drain 42 and a center tap 57 and a second resistor 58 connected between the center tap 57 and ground. In the preferred embodiment, the first resistor 56 is a 4.7 K resistor while the second resistor 58 is a 47 K resistor. The center tap 57 of the voltage divider 55 is connected to a feedback port 60 on the microprocessor 35. A capacitor 62 is connected between the feedback port 60 and ground The capacitor 62 removes undesirable high frequency noise from the feedback signal and smoothes the feedback voltage applied to the feedback port 60. A feedback resistor 64, which has a value of 200 K in the preferred embodiment, is connected between the anode of the diode 52 and the center tap 57 of the voltage divider 55.

The operation of the circuit 30 will now be described. At the beginning of a braking cycle, the relay output port 34 of the microprocessor 35 goes from ground potential to a high state, which in the preferred embodiment is five volts. The high state of the relay output port 34 causes the power relay to close, or, for a solid state device, change to a conducting state. As a result, power is applied to the high end of the solenoid valve coils and the ABS pump motor. However, electronic switches which are connected between the low end of the coils and ground and also between the motor and ground prevent actuation of the devices until called for by the microprocessor upon detection of a potential wheel lock-up condition.

The present invention contemplates application of a Pulse Width Modulated (PWM) control signal to the gate 48 of the FET 44 to actuate the solenoid valve coil 40 and to control the current flowing therethrough. As best seen in the graph shown in FIG. 3, which illustrates the control signal at the control signal output port 50 as a function of time during a typical braking cycle, a PWM voltage having a constant frequency and variable duty cycle is generated by the microprocessor 35. The frequency of the PWM voltage is selected to be compatible with the response time of the associated solenoid cartridge. In the preferred embodiment, a frequency in the range of two to three kilohertz is used; however, the invention also can be practiced using other frequencies. Prior to the time $t_1$, the voltage at the output port is at ground potential. Accordingly, the gate 48 of the FET 44 also is at ground potential and the FET 44 is in its non-conducting state. Consequently, no current flows through the solenoid coil 40 before $t_1$, as is illustrated in the graph of coil current as a function of time shown in FIG. 4. Because the power relay 32 is in a closed or conducting state, approximately the full supply voltage appears at the FET drain 42, as illustrated in the lower graph of drain voltage vs. time shown in FIG. 5.

At $t_1$, the microprocessor 35 determines that the solenoid coil 40 should be actuated. Accordingly, a PWM control signal having a 100% duty cycle is generated at the control signal output port 50. In the preferred embodiment, the PWM voltage is five volts; however, other voltages levels can be used. When the FET gate 48 goes "high" the FET 44 switches to its conducting state and the drain voltage goes to essentially zero, as shown in FIG. 5. After the FET 44 switches to its conducting state, current begins to flow through the valve solenoid coil 40 and, as shown in FIG. 4, increases following an exponential curve.

At $t_2$, the current has increased sufficiently to move the solenoid valve armature to its actuated position, that is, closed for a normally open valve and open for a normally closed valve, but not to a level that the coil 40 is saturated. Accordingly, the microprocessor 35 begins generating a PWM control signal having a first predetermined duty cycle selected to cause an average current to flow through the coil 40 which is sufficient to hold the armature in position without saturating the coil 40. While a 50 percent duty cycle is shown in FIG. 3, it will be appreciated that the value is exemplary and that the invention can be practiced utilizing other duty cycles. As shown in FIG. 5, the drain voltage switches between ground potential and the voltage appearing between the FET drain and source, 42 and 46, when the FET 44 is not conducting. The voltage between the FET drain and source, 42 and 46, is shown as being the same as the voltage prior to $t_1$, due to the clamping effect of the Zener diode 54 upon the voltage appearing across the coil 40. The valve coil 40 is actuated in the example shown in FIGS. 3 through 5 from $t_2$ through $t_3$.

At $t_3$, the microprocessor 35 determines that the valve coil 40 should be deactivated. Accordingly, the duty cycle of the control signal is reduced to a second predetermined valve, which, for illustrative purposes, is shown as 25 percent in FIG. 3. Accordingly, the coil current begins to gradually decrease, as shown in FIG. 4. Because the coil 40 is not saturated, the armature will begin returning to its original position, that is, closed for a normally closed valve and open for a normally open valve, immediately upon the current beginning to decrease. Therefore, the response of the circuit 30 is faster than the prior art control circuits. The present invention also contemplates a "soft" completion of stop. Upon the armature approaching its deactuated position, the duty cycle is increased to an intermediate predetermined value which is greater than the second predetermined value but less than the first predetermined value. This is illustrated at $t_4$, where the control signal duty cycle is increased to 40 percent. Again the illustrated intermediate duty cycle is intended to be exemplary and the invention also can be practiced with other values. The increased duty cycle slows the return movement of the valve armature and thus decreases the acoustic noise generated thereby.

At $t_5$, the braking cycle has ended and the control signal returns to ground potential causing the FET 44 to be in its non-conducting state and thereby blocking any current flow through the solenoid valve coil 40. Alternately, the invention contemplates maintaining a control signal having a predetermined stand-by duty cycle (not shown) which would cause a small current to flow through the coil 40. The standby-by duty cycle would be selected to provide a current sufficiently small to allow the armature to remain in its deactuated position; however, because the current is all ready established, the transition time required to actuate the solenoid valve would be reduced.

While the circuit 30 has been illustrated and described above with the PWM voltage applied directly from the microprocessor port 50 to the FET gate 48, it will be appreciated that the invention also can be practiced with the current limiting resistor 49 replaced by a conventional driver circuit connected between the microprocessor output port 50 and the FET gate 48.

Additionally, it is contemplated that the PWM control voltage can be applied to actuate a proportional valve. A proportional valve has a variable armature position to control the flow of fluid through the valve. The amount of valve opening is a function of the coil current. By varying the duty cycle of the PWM control signal, the armature can be held in any one of a plurality of partially open positions. Thus, the use of a PWM control signal provides a great deal of flexibility in controlling the solenoid valve and is an improvement over the prior art methods of controlling solenoid valves where the valve was controlled between only two positions, open or closed. If a reduced flow were desired, the prior art valve would be continuously cycled between its closed and open positions.

The circuit 30 also includes a series connection of a diode 52 and a Zener diode 54 which are connected across the valve coil 40. The diode 52 provides a discharge path for the residual coil current when the FET 44 switches to its non-conducting state. The Zener diode 54 clamps the voltage thereacross to the value of the diode rating and thereby limits the voltage applied to the feedback resistor 64.

The circuit 30 further includes a voltage divider 55 and a feedback resistor 64 which are used to monitor the condition of circuit components. The voltage appearing at the center tap 57 of the voltage divider 55 is applied to the feedback port of the ABS microprocessor 35. When the FET 44 is in its conducting state and the circuit components are functioning properly, the drain 42 is at approximately ground potential and the voltage at the voltage divider center tap 57 is also at approximately ground potential. When the FET 44 is in its non-conducting state and the circuit components are functioning properly, the potential at the drain 42 raises and appears across the voltage divider. The ABS microprocessor 35 monitors the center tap voltage at the feedback port 60, which is an analog to digital input port. Based upon the ABS control algorithm sequence, the signal received at the feedback port 60 should have an expected value. If the expected value is not present, the microprocessor 35 determines that a component has failed and disables the ABS. The microprocessor 35 would also provide a warning signal, such as illuminating the ABS light upon the vehicle dashboard that a component has failed.

Figure 6:
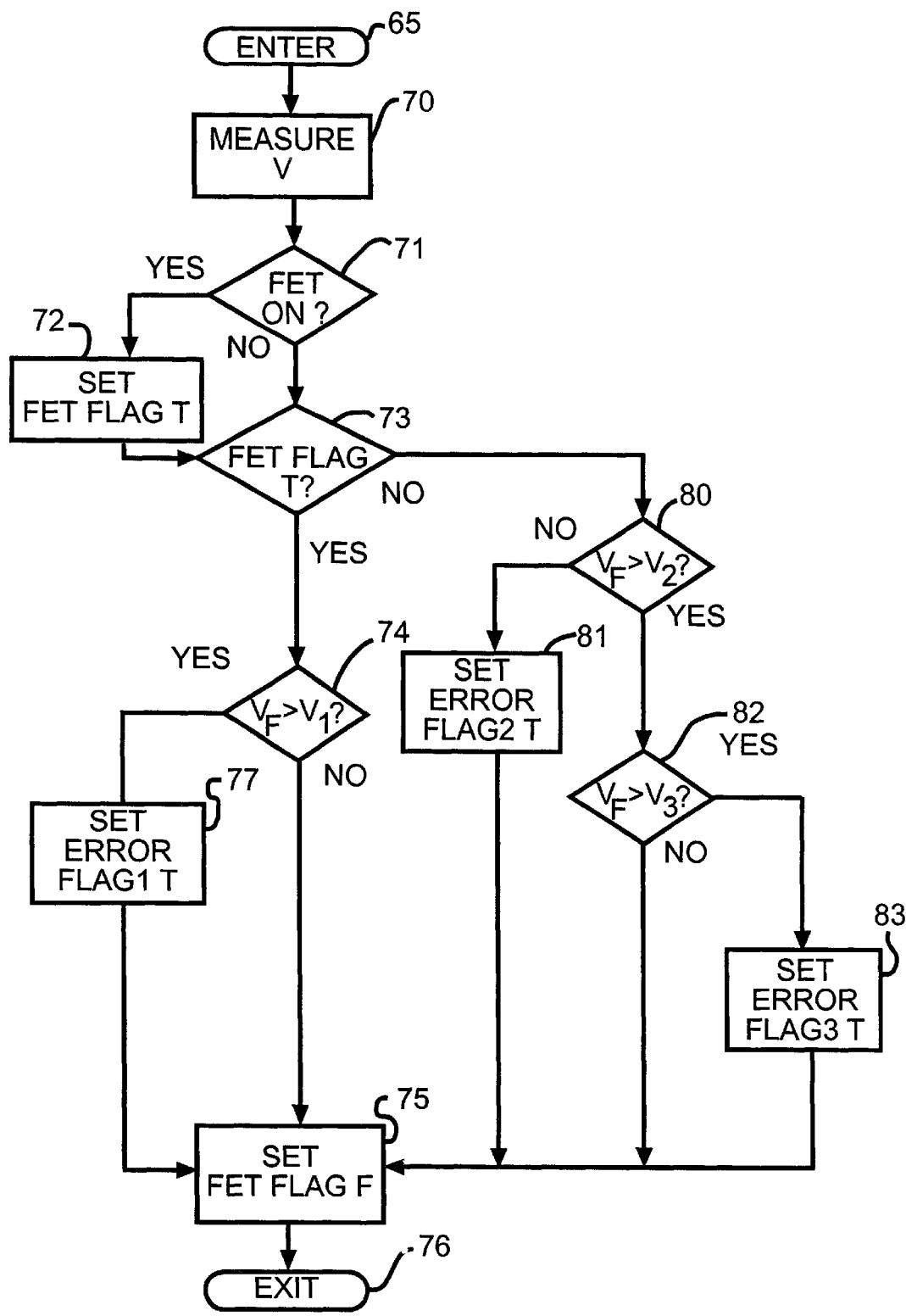
FIG. 6 is a flow chart of a diagnostic subroutine for the circuit shown in FIG. 2.

In the preferred embodiment, the microprocessor 35 runs a diagnostic subroutine during each iteration of the ABS control algorithm. The diagnostic subroutine is illustrated by the flow chart shown in FIG. 6. It will be appreciated that the flow chart shown in FIG. 6 is exemplary and that the invention can be practiced utilizing other subroutines. The algorithm is entered at entrance block 65. The feedback voltage, $V_F$, which is the voltage at the center tap 57 of the voltage divider 55, is measured in functional block 70. The microprocessor 35 then checks the ABS control algorithm sequence to determine if the FET 44 should be in its conducting state, or "on", in decision block 71. If the FET 44 should be on, the FET FLAG is set True in functional block 72 and the subroutine transfers to decision block 73. If the FET 44 should be in its non-conducting state, or "off", the subroutine transfers directly from decision block 71 to decision block 73. As will be explained below, when the algorithm transfers directly from decision block 71 to decision block 73, the FET FLAG is all ready set False.

In decision block 73, the microprocessor 35 examines the FET FLAG. If the FET FLAG is true, that is, the FET 44 should be on, the subroutine transfers to decision block 74 where the feedback voltage $V_F$ is compared to a first threshold voltage $V_1$. The first threshold voltage is a function of the voltage appearing across the drain 42 and source 46 of the FET 44 when the FET 44 is on and, in the preferred embodiment, is 0.6 volts. If the feedback voltage $V_F$ is less than or equal to the first threshold voltage $V_1$, the circuit 30 is functioning properly and the subroutine transfers to functional block 75 where the FET FLAG is reset False. The subroutine then exits back to the main ABS control algorithm through exit block 76.

If the feedback voltage $V_F$ is greater than the first threshold voltage $V_1$ in decision block 74, it is an indication that either the solenoid coil 40 is shorted or the FET 44 is open and the subroutine transfers to functional block 77 where ERROR FLAG 1 is set True. The subroutine then transfers to functional block 75 where the FET FLAG is reset False. The subroutine next exits through block 76 to the main ABS control algorithm where the True ERROR FLAG1 causes the microprocessor 35 to disable the ABS and illuminate a warning light. Optionally, the True ERROR FLAG1 can be stored in the microprocessor memory for later use as a diagnostic aid.

If, in decision block 73, the FET FLAG is False, indicating that the FET 44 should be off, the algorithm transfers to decision block 80 where the feedback voltage $V_F$ is compared to a second threshold $V_2$. If the feedback voltage $V_F$ is less than the second threshold $V_2$, it is an indication that the either the solenoid coil 40 is open or that the FET 44 is shorted and the algorithm transfers to functional block 81 where ERROR FLAG2 is set True. The subroutine then transfers to functional block 75 where the FET FLAG is reset False. The subroutine next exits through block 76 to the main ABS control algorithm where the True ERROR FLAG2 causes the microprocessor 35 to disable the ABS and illuminate the warning light. As described above, the True ERROR FLAG2 can be optionally stored in the microprocessor memory for later use as a diagnostic aid.

If, in decision block 80, the feedback voltage $V_F$ is greater than or equal to the second threshold voltage $V_2$, the subroutine transfers to decision block 82 where the feedback voltage $V_F$ is compared to a third threshold voltage $V_3$. In the preferred embodiment, the second threshold is two volts. If the feedback voltage $V_F$ is greater than the third threshold $V_3$, it is an indication that either the diode 52 or the Zener diode 54 has shorted and the algorithm transfers to functional block 83 where ERROR FLAG3 is set True. The subroutine then transfers to functional block 75 where the FET FLAG is reset False. The subroutine next exits through block 76 to the main ABS control algorithm where the True ERROR FLAG3 causes the microprocessor 35 to disable the ABS and illuminate the warning light. As described above, the True ERROR FLAG3 can be optionally stored in the microprocessor memory for later use as a diagnostic aid.

If, in decision block 82, the feedback voltage $V_F$ is less than or equal to the third threshold voltage $V_3$, the circuit 30 is functioning properly and the subroutine transfers to functional block 75 where the FET FLAG is reset False. The subroutine then exits back to the main ABS control algorithm through exit block 76.

The threshold values $V_1$, $V_2$ and $V_3$ are selected to correspond to the specific components which are included in the circuit 30. In the preferred embodiment, $V_1=V_2$ and both are equal to 0.6 volts; however, all three threshold voltages can have different values. While the preferred embodiment of the invention has been described and illustrated with a constant frequency control signal having a variable duty cycle, it will be appreciated that the invention also can be practiced with a fixed duty cycle, variable frequency control signal. Additionally, the invention also can be used to control a digital solenoid valve without PWM of the coil voltage, but providing verification of correct functioning of the electrical components.

Figure 7:
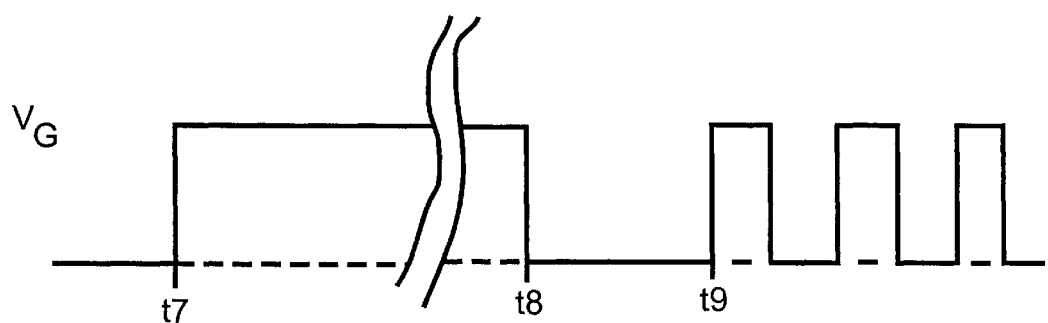
FIG. 7 illustrates the voltage at the output port of the microprocessor included in the circuit shown in FIG. 2 for an alternate control strategy.
Figure 8:
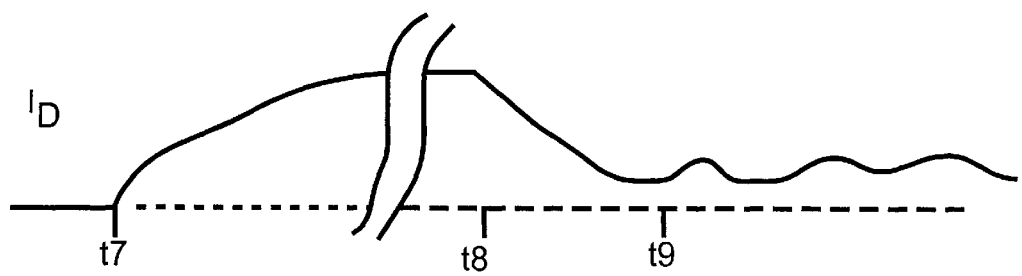
FIG. 8 illustrates current flowing through the solenoid coil included in the circuit shown in FIG. 2 resulting from the voltage shown in FIG. 7.
Figure 9:
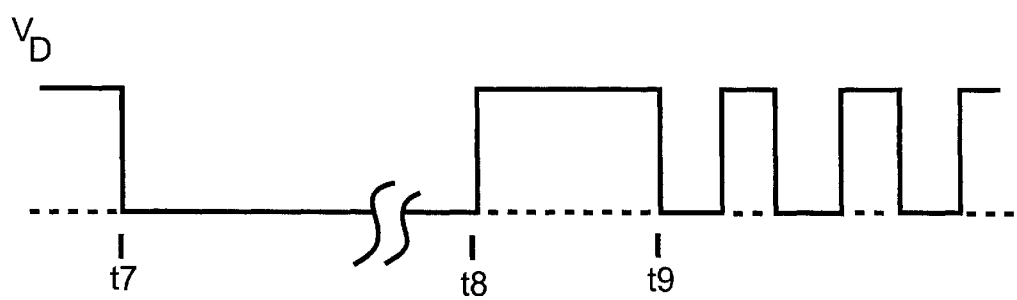
FIG. 9 illustrates the voltage at the drain of the field effect transistor included in the circuit shown in FIG. 2 resulting from the voltage shown in FIG. 7.

An alternate control strategy for the circuit shown in FIG. 2 is illustrated in FIGS. 7 through 9. The strategy is illustrated for reopening a closed isolation valve. At $t_7$ the gate voltage goes high, as shown in FIG. 7, which switches the FET 44 to its conducting state and thereby causes the drain voltage $V_D$ to go to approximately ground, as shown in FIG. 9. As a result, the drain current $I_D$, which flows through the solenoid coil 40, increases exponentially. Once the drain current $I_D$ reaches a sufficient magnitude, the isolation valve associated with the coil 44 closes.

At $t_8$, the ABS microprocessor 35 determines that the isolation valve should be reopened to increase the pressure applied to the controlled wheel brake. Accordingly, the gate voltage $V_G$ is reduced to zero, causing the FET 44 to switch back to its non-conducting state. As a result, the drain current $I_D$ rapidly decays, as illustrated between $t_8$ and $t_9$ in FIG. 8. A comparison to FIG. 4 shows that the current decays more rapidly in FIG. 8 than when the gate voltage changes immediately to a PWM pulse train from a constant high state.

After a predetermined time period, which is selected to match the inductance of the coil and is long enough to allow a sufficient decay of the coil current, the gate voltage becomes a PWM pulse train, as shown beginning at $t_9$ in FIG. 7. Generally, the predetermined time period is directly proportional to the inductance of the solenoid coil which is being controlled. In the preferred embodiment, the predetermined time period is approximately 700 microseconds; however, the invention also can be practiced with a longer or shorter predetermined time period. Depending upon the duty cycle of the PWM, the armature of the valve may continue to a fully open position, or the armature may "float" in a partially open position. When the valve "floats" following opening, it is considered to have had a "soft opening". Because the valve armature does not contact the valve seat, the noise of valve operation is reduced by eliminating hydraulic hammering in the brake lines. Accordingly the Noise, Vibration and Harshness (NVH) of the vehicle is reduced. Similarly, if the valve is fully opened, the armature may be held in balance with the return spring by maintaining a small average current flow through the solenoid coil 44. This would allow a rapid response to a command to reclose the isolation valve. Accordingly, the duty cycle is selected to provide the desired response. The invention also contemplates that the duty cycle can be varied as required.

While the preferred embodiment has been described above for an isolation valve, it will be appreciated that the control strategy also can be utilized to reclose an open dump valve.

Figure 10:
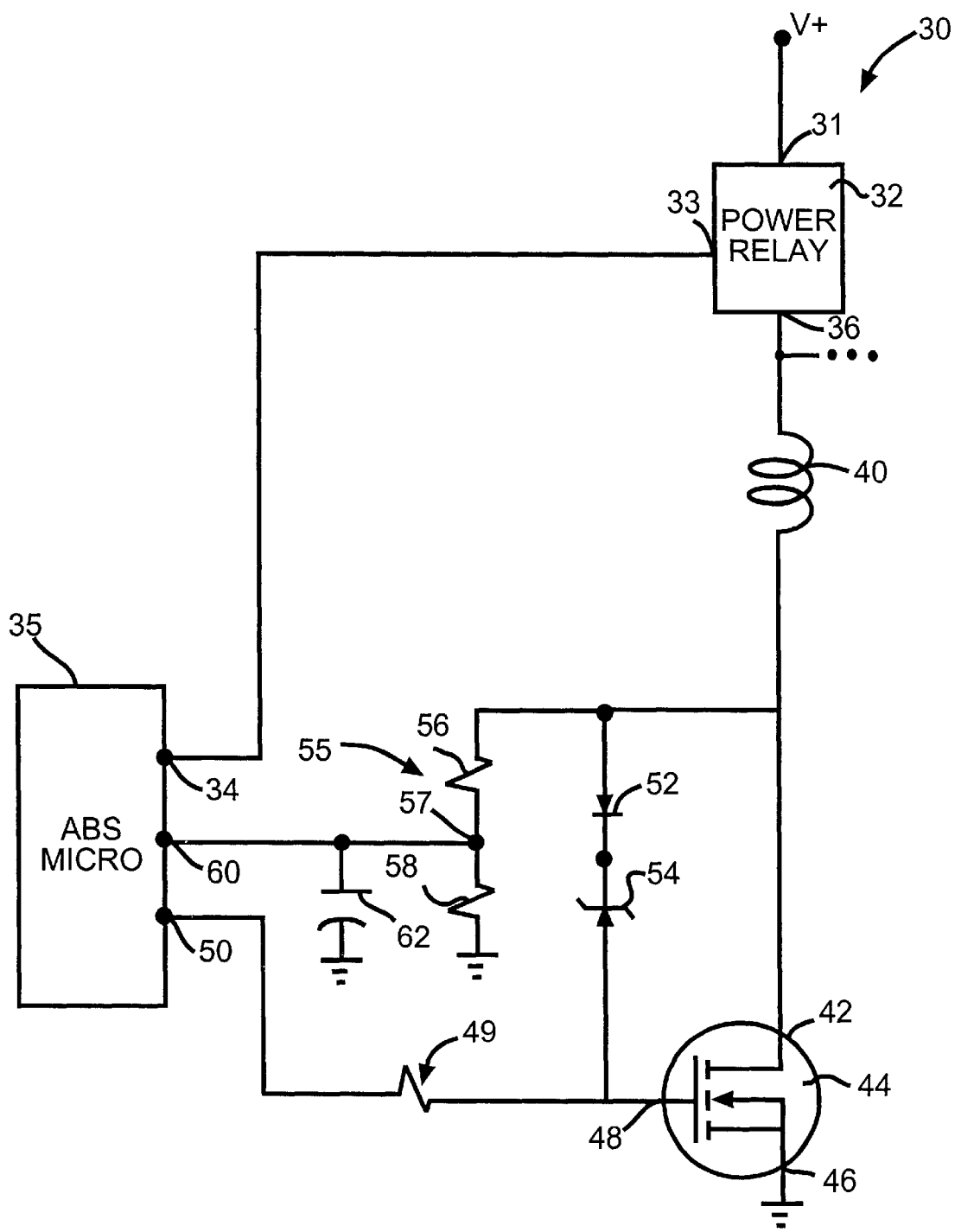
FIG. 10 is a schematic diagram for an alternate embodiment of the modulation circuit shown in FIG. 2.

An alternate embodiment of the circuit shown in FIG. 2 is illustrated in FIG. 10, where components which are similar to components shown in FIG. 2 have the same numerical designators. The alternate embodiment includes an active clamp circuit comprising the diode 52 and Zener diode 54 connected in series between the FET drain and gate 42 and 48. The diode 52 has an anode connected to the drain 42 of the FET 44 and a cathode connected to the cathode of the Zener diode 54. The anode of the Zener diode 54 is connected to the gate 48 of the FET 48. Accordingly, the clamp circuit allows the coil current to flow through the FET 44 to ground while holding the voltage between the FET drain 42 and gate 48 at a fixed value when the FET 44 is switched to its non-conducting state to avoid damage to the FET 44.

The voltage divider 55 is connected between the drain 42 and ground. Accordingly, the voltage appearing at the drain 42, which is indicative of the condition of the FET 44 and the diode 52 and Zener diode 54, is fed back to the microprocessor feedback port 60. Similar to the circuit shown in FIG. 2, the feedback voltage is compared to predetermined values to confirm that the components are functioning properly. If the feedback voltage is not within an expected range of values, the microprocessor 35 sets an appropriate error valve.

Figure 11:
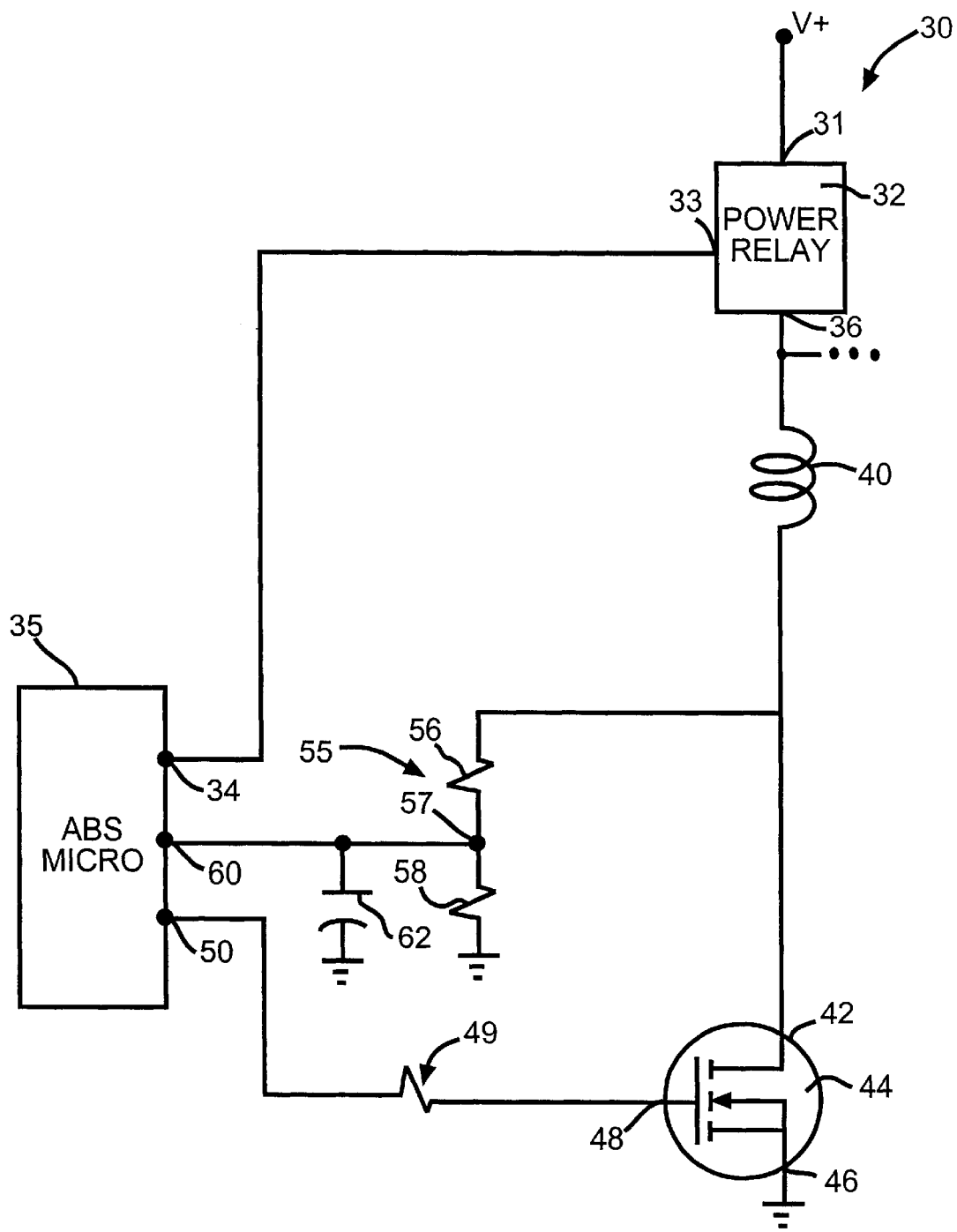
FIG. 11 is a schematic diagram for another alternate embodiment of the modulation circuit shown in FIG. 2.

Another alternate embodiment of the circuit is illustrated in FIG. 11, where the clamp circuit is omitted. In FIG. 11, when the FET 44 is switched to its non-conducting state, the voltage appearing across the coil 40 causes the FET 44 to enter its avalanche breakdown region. Accordingly, the FET 44 is selected to have a sufficient power rating to allow passage of the coil current without damaging the FET 44. Again the voltage divider 55 is connected between the FET drain 42 and ground and provides feedback concerning the condition of the circuit components to the ABS microprocessor 35.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope. For example, while the preferred embodiment of the invention has been illustrated and described for use in an ABS, it will be appreciated that the invention also can be practiced in other systems, such as traction control and vehicle stability control.

What is claimed is:

1. A control unit for a solenoid valve comprising:
   a power supply;
   a solenoid valve coil have a first end and a second end, said first end of said solenoid valve coil being connected to said power supply;
   an electronic switch having a first terminal connected to said second end of solenoid valve coil, said electronic switch also having a second terminal connected to ground, said electronic switch operable for controlling the flow of an electric current through said solenoid valve coil, said switch further having a control port and being responsive to a control signal applied to said control port to transition between conducting and non-conducting stages;

a signal generator included within a microprocessor, said microprocessor having an output control port connected to said control port of said electronic switch, said signal generator operative to generate a control signal at said microprocessor output control port, said control signal being a pulse width modulated signal having a variable duty cycle and a constant frequency and said signal generator being operable to generate a first control signal with a predetermined first constant duty cycle sufficient to begin to move an armature of an associated solenoid valve and then to generate a second control signal with a second predetermined constant duty cycle that is less than said first duty cycle and is sufficient to maintain the associated solenoid valve armature in a desired position within the valve; and a single voltage divider connected across said electronic switch, said voltage divider including a center tap connected to a feedback port of said microprocessor, said microprocessor being responsive to a voltage appearing at said center tap to confirm the operation of said electronic switch.

2. The control unit according to claim 1 further including a diode having an anode connected to the junction of said solenoid coil supply and said electronic switch and further including a Zener diode having a cathode connected to an cathode of said diode, said Zener diode also having an anode connected to said control port of said electronic switch, said diode and Zener diode being operative to provide a discharge path through said electronic switch for the coil current when said switch changes from a conducting to a non-conducting state.

3. The control unit according to claim 2 wherein said electronic switch is a field effect transistor having a gate coupled to said microprocessor control port.

4. The control unit according to claim 1 further including a diode having a cathode connected to the end of said solenoid coil connected to said power supply and further including a Zener diode having an anode connected to an anode of said diode, said Zener diode also having a cathode connected to the junction of said solenoid coil supply and said electronic switch, said diode and Zener diode being operative to provide a discharge path for the coil current when said switch changes from a conducting to a non-conducting state.

5. The control unit according to claim 4 further including a feedback resistor connected between the junction of said diode and said Zener diode and said center tap of said voltage divider, said microprocessor being responsive to the voltage appearing at said voltage divider center tap to confirm the operation of said solenoid coil.

6. The control unit according to claim 5 wherein said electronic switch is a field effect transistor having a gate coupled to said microprocessor control port.

7. The control unit according to claim 6 wherein the control unit is included in an anti-lock brake system.

8. The control unit according to claim 7 wherein the control unit is included in a traction control system.

9. The control unit according to claim 4 further including a feedback resistor connected between the junction of said diode and said Zener diode and said center tap of said voltage divider, said microprocessor being responsive to the voltage appearing at said voltage divider center tap to confirm the operation of said diode.

10. The control unit according to claim 4 further including a feedback resistor connected between the junction of said diode and said Zener diode and said center tap of said voltage divider, said microprocessor being responsive to the voltage appearing at said voltage divider center tap to confirm the operation of said Zener diode.

11. A method for controlling the current flowing through a solenoid valve coil comprising the steps of:

(a) providing an electronic switch connected to the valve coil, the switch having a control port and being responsive to a control voltage applied to the control port to change between conducting and non-conducting states;

(b) applying a pulse width modulated control voltage having a constant frequency and variable duty cycle to the control port of the switch, the voltage having an initial duty cycle having a first predetermined value, the initial duty cycle being sufficient to cause the valve armature to begin to move within the valve from a deactuated position to an actuated position;

(c) reducing the duty cycle to a second predetermined value upon the valve armature reaching a desired position within the solenoid valve, the second predetermined value being less than the first predetermined value, the second predetermined value being sufficient to provide a coil current which will hold the valve armature in the desired position; and (d) subsequent to step (c), further reducing the duty cycle to a third predetermined value that is less than the second predetermined value and greater than zero to cause the valve armature to begin to move back toward the deactuated position.

12. The method according to claim 11 further including providing a device for periodically sampling the voltage across the electronic switch when the electronic switch is a conducting state and comparing the sampled voltage to a first threshold voltage, the device being operative to actuate a warning device if the sampled voltage is greater than the first threshold voltage.

13. The method according to claim 12 wherein the device for periodically sampling the voltage across the electronic switch also samples the voltage across the electronic switch when the electronic switch is in a non-conducting state and compares the sampled voltage to a second threshold voltage, the device being operative to actuate the warning device if the sampled voltage is less than the second threshold voltage.

14. The method according to claim 13 wherein the voltage sampled while the electronic switch is in a non-conducting state is compared to a third threshold voltage and the device actuates the warning device if the sampled voltage is greater than the third threshold voltage.

15. The method according to claim 13 wherein the third threshold voltage is greater than the second threshold voltage.

16. The method according to claim 11 also including increasing the duty cycle to a fourth predetermined value which is between the second and third predetermined values for the duty cycle as the valve armature approaches the deactuated position to slow the return of the armature to the deactuated position.

17. The method according to claim 11 wherein the solenoid valve is a proportional valve.

* * * * *